(12) United States Patent
Tomizawa et al.

(10) Patent No.: US 8,547,420 B2
(45) Date of Patent: Oct. 1, 2013

(54) IMAGE PICKUP APPARATUS

(75) Inventors: Masaomi Tomizawa, Hachioji (JP);
Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 659 days.

(21) Appl. No.: 12/760,129

(22) Filed: Apr. 14, 2010

(65) Prior Publication Data

US 2010/0265317 A1    Oct. 21, 2010

(30) Foreign Application Priority Data

Apr. 15, 2009    (JP) ................................ 2009-099205

(51) Int. Cl.
*H04N 13/02*    (2006.01)
(52) U.S. Cl.
USPC ............................................. 348/46; 346/47
(58) Field of Classification Search
USPC .............................. 348/471, 46–50; 382/190
See application file for complete search history.

(56) References Cited

U.S. PATENT DOCUMENTS

| 5,801,760 A * | 9/1998 | Uomori ........................... 348/47 |
| 7,751,701 B2 * | 7/2010 | Endo .............................. 396/123 |
| 2009/0087099 A1 * | 4/2009 | Nakamura ..................... 382/190 |

FOREIGN PATENT DOCUMENTS

JP            07-325354        12/1995

* cited by examiner

*Primary Examiner* — William C Vaughn, Jr.
*Assistant Examiner* — Naod Belai
(74) *Attorney, Agent, or Firm* — John C. Pokotylo; Straub & Pokotylo

(57) ABSTRACT

An image pickup apparatus of the present invention includes: a photographing section that can photograph a subject from a plurality of viewpoints with parallax, and can photograph a 2D moving image of the subject obtained by photographing from at least one of the viewpoints and a 3D image of the subject obtained by photographing from the plurality of the viewpoints; a recording section that records the 2D moving image and the 3D image; a subject situation determination section that determines a timing suitable for photographing the 3D image while photographing the 2D moving image; and a photographing control section that controls the photographing section so as to photograph the 3D image when the subject situation determination section determines that the timing is suitable for photographing the 3D image.

6 Claims, 14 Drawing Sheets

IMAGE PICKUP APPARATUS

CROSS REFERENCE TO RELATED APPLICATION

This application claims the benefit of Japanese Application No. 2009-99205 filed in Japan on Apr. 15, 2009, the contents of which are incorporated herein by this reference.

BACKGROUND OF THE INVENTION

1. Field of the Invention

The present invention relates to an image pickup apparatus that can photograph a stereoscopically displayable 3D image by photographing a subject from a plurality of different viewpoints.

2. Description of the Related Art

A technique has been known of photographing the same subject from a plurality of different viewpoints to photograph a stereoscopically (3D) displayable still image (3D still image) or moving image (3D moving image).

As a method of photographing a 3D displayable image, for example, as disclosed in Japanese Patent No. 3722498, a method is known of photographing from a plurality of viewpoints while moving one image pickup apparatus by a predetermined distance. As a method of photographing a 3D displayable image, a method of photographing using an image pickup apparatus including two photographing lenses separated from each other by a predetermined distance, or a method of photographing with two image pickup apparatuses being separated from each other by a predetermined distance and fixed is also known.

A display device that displays a 3D image has been commonly used, and a user can easily photograph and view a 3D still image or a 3D moving image.

If a 3D moving image is always stereoscopically displayed, the viewer gets used to the stereoscopic display, and the 3D moving image cannot always provide a stronger feeling of "being there" to the viewer than a general 2D moving image. Thus, performance for providing a feeling of "being there" to a viewer is also important for a 3D moving image like a general 2D moving image.

BRIEF SUMMARY OF THE INVENTION

An image pickup apparatus of the present invention includes: a photographing section that can photograph a subject from a plurality of viewpoints with parallax, and can photograph a 2D moving image of the subject obtained by photographing from at least one of the viewpoints and a 3D image of the subject obtained by photographing from the plurality of the viewpoints; a recording section that records the 2D moving image and the 3D image; a subject situation determination section that determines a timing suitable for photographing the 3D image while photographing the 2D moving image; and a photographing control section that controls the photographing section so as to photograph the 3D image when the subject situation determination section determines that the timing is suitable for photographing the 3D image.

DETAILED DESCRIPTION OF THE PREFERRED EMBODIMENTS

Figure 1:
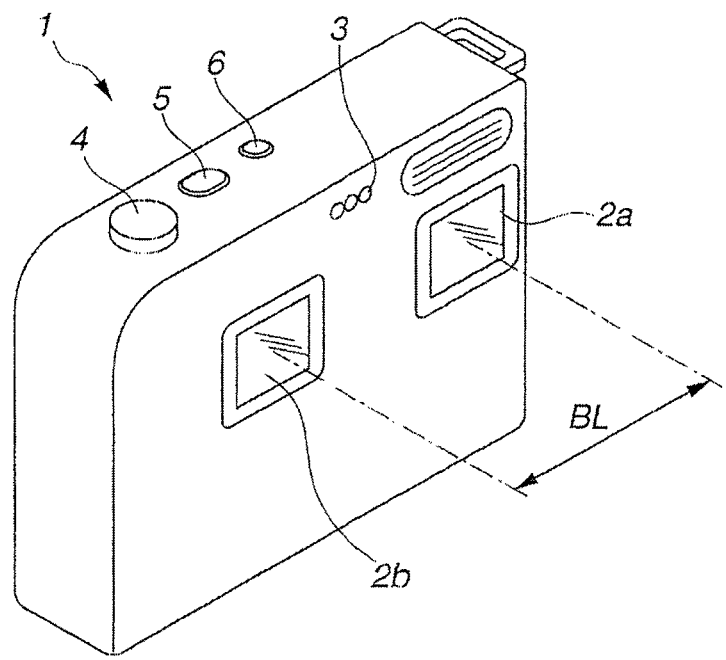
FIG. 1 is a perspective view showing a front side of an image pickup apparatus.

Preferred embodiments of an image pickup apparatus of the present invention will be described with reference to the drawings. In the drawings used for the description below, components have different scales so as to have recognizable sizes in the drawings, and the present invention is not limited to the numbers of the components, shapes of the components, size ratios of the components, and relative positional relationships between the components shown in the drawings.

(First Embodiment)

An image pickup apparatus of the present embodiment is an apparatus that can electronically record a still image and a moving image, and photographs the same subject from a plurality of different viewpoints to obtain a stereoscopically displayable image of the subject.

Hereinafter, a combination of still images with parallax and a combination of moving images with parallax obtained by substantially synchronously photographing a subject from a plurality of different viewpoints are referred to as a 3D still image and a 3D moving image, respectively. At least one of the 3D still image and the 3D moving image is simply referred to as a 3D image.

A still image and a moving image without parallax obtained by photographing a subject from one viewpoint are referred to as a 2D still image and a 2D moving image, respectively. At least one of the 2D still image and the 2D moving image is simply referred to as a 2D image.

An image pickup apparatus 1 of the present embodiment includes, by way of example, a photographing section 2 that photographs a subject from two viewpoints separated from each other by a predetermined base line length BL as shown in FIG. 1. The photographing section 2 includes a left photographing section 2a and a right photographing section 2b corresponding to the two viewpoints.

The image pickup apparatus 1 can photograph the subject from different viewpoints with the left photographing section 2a and the right photographing section 2b to record a 3D still image of the subject. Also, the image pickup apparatus 1 can photograph the subject with one of the left photographing section 2a and the right photographing section 2b to record a 2D still image of the subject. It may be allowed that the image pickup apparatus 1 can further record a 2D moving image and a 3D moving image of the subject.

A configuration of the photographing section 2 is not limited as long as the photographing section 2 can photograph a subject with parallax from two different viewpoints. In the present embodiment, a photographing lens and an image pickup device such as a CCD sensor or a CMOS sensor are provided in each of the left photographing section 2a and the right photographing section 2b.

Figure 2:
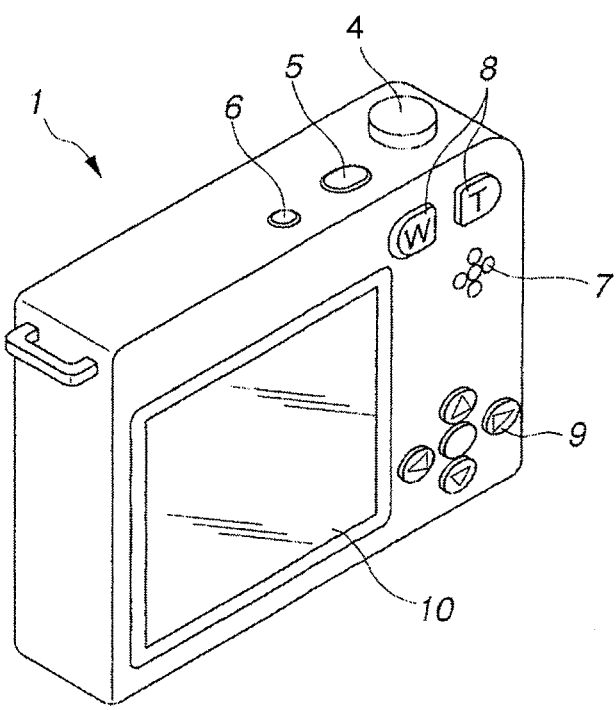
FIG. 2 is a perspective view showing a back side of the image pickup apparatus.

The photographing section 2 may include a single image pickup device, and a pair of photographing lenses that are provided in the left photographing section 2a and the right photographing section 2b, respectively, and form a subject image on the image pickup device, and be configured so that a light flux from the pair of photographing lenses to the image pickup device can be switched at high speed by a movable mirror or a liquid crystal shutter. For example, if a left viewpoint image obtained via the left photographing section 2a and a right viewpoint image obtained via the right photographing section 2b can be switched and photographed every $1/120$ seconds by the image pickup device, a 3D still image and a 3D moving image obtained by substantially synchronously photographing the subject from the two different viewpoints can be recorded First, with reference to FIGS. 1 and 2, an exterior configuration of the image pickup apparatus 1 will be described. On a front surface of the image pickup apparatus 1 facing the subject, the left photographing section 2a and the right photographing section 2b, and also a microphone 3 for recording voice are provided.

On a back surface of the image pickup apparatus 1, a speaker 7 for outputting voice, and an image display section 10 for displaying and outputting an image are provided. The speaker 7 can output, for example, voice recorded simultaneously with photographing a 2D moving image or a 3D moving image.

The image display section 10 can display a 2D still image and a 2D moving image, and can display an image with parallax photographed from two different viewpoints to display a 3D still image and a 3D moving image. Such an image display section 10 is well known, and thus detailed descriptions thereof will be omitted. The image display section 10 may be configured as a so-called touch panel including a touch sensor as an operation member on a display surface.

On upper and back surfaces of the image pickup apparatus 1, an operation member for a user to input an operation instruction of the image pickup apparatus 1 is provided. The operation member includes a still image photographing switch 4, a moving image photographing switch 5, a power switch 6, a zoom operation switch 8, a cross switch 9, and the like.

The still image photographing switch 4 is a switch for inputting an instruction for a photographing operation of a 2D still image or a 3D still image by the image pickup apparatus 1. The moving image photographing switch 5 is a switch for inputting instructions to start and stop a photographing operation of a 2D moving image or a 3D moving image by the image pickup apparatus 1.

The power switch 6 is a switch for inputting an instruction to switch between a power-on state and a power-off state of the image pickup apparatus 1. The zoom operation switch 8 is a switch for inputting an instruction for a change operation (zoom operation) of a focal length of the left photographing section 2a and the right photographing section 2b. The cross switch 9 is a switch for inputting an instruction to change an operation mode of the image pickup apparatus 1.

In the present embodiment, the operation member includes the plurality of push switches, but the operation member may include a lever switch, a dial switch, a touch sensor, a luminance sensor, an acceleration sensor, and the like.

Figure 3:
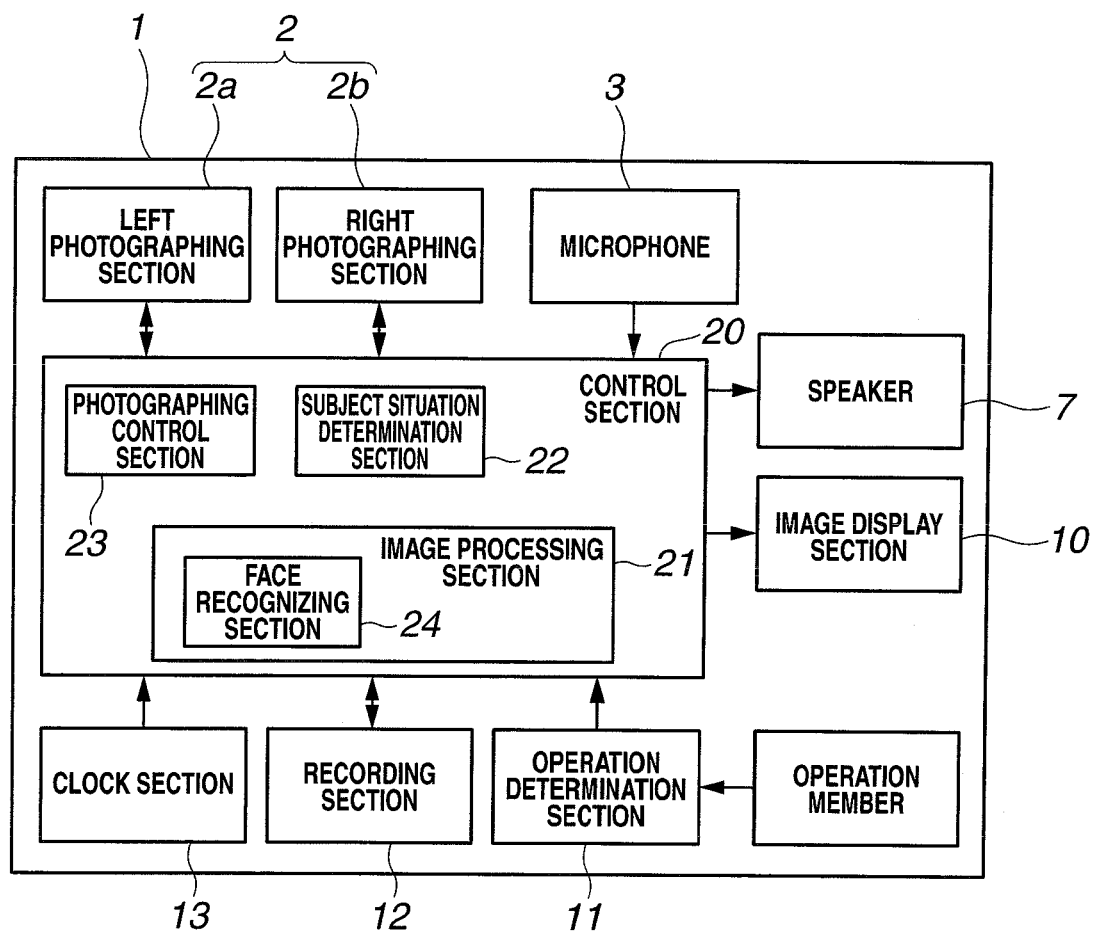
FIG. 3 is a block diagram illustrating an outline configuration of the image pickup apparatus.

Next, with reference to FIG. 3, a configuration for controlling an operation of the image pickup apparatus 1 will be described. The image pickup apparatus 1 includes a control section 20, an operation determination section 11, a recording section 12, and a clock section 13. The image pickup apparatus 1 includes a power supply section for supplying power required for operations of components of the image pickup apparatus 1, although not shown. The image pickup apparatus 1 may include a communication section that can transmit and receive an image or the like to and from an external device by wired or wireless communication.

The control section 20 is a control device that includes a calculation device, a storage device, an input/output device, a power control device, and the like, and controls the operations of the components of the image pickup apparatus 1 based on a predetermined program. The control section 20 includes an image processing section 21, a subject situation determination section 22, and a photographing control section 23 as components required for achieving the operation of the image pickup apparatus 1 to be described later. The image processing section 21, the subject situation determination section 22, and the photographing control section 23 may be mounted to the control section 20 as hardware or software.

The image processing section 21 performs predetermined image processing of an image photographed by the photographing section 2. In the present embodiment, the image processing section 21 includes a face recognizing section 24 that recognizes the number, position, size and facial expression of faces of persons in the image by predetermined image processing such as pattern matching. The image processing section 21 includes a contrast calculation section (not shown) that calculates a contrast value of an image used for a focusing operation of the photographing section 2.

The subject situation determination section 22 determines the present situation of the subject based on information such as a focal length and a focusing length of the left photographing section 2a and the right photographing section 2b of the photographing section 2, the number, position, size and facial expression of faces of persons in the image recognized by the face recognizing section 24, and voice inputted from the microphone 3, which will be described later in detail.

The photographing control section 23 controls the photographing operation of the photographing section 2 based on an output result from the subject situation determination section 22, which will be described later in detail.

The operation determination section 11 determines an operation instruction inputted by a user via the above-described operation member. A determination result by the operation determination section 11 is outputted to the control section 20. The recording section 12 is a device that can record information, and records the image photographed by the photographing section 2 in the present embodiment. The recording section 12 includes a recording medium such as a nonvolatile memory of a semiconductor or a small hard disk drive. The recording section 12 may be provided separately from the image pickup apparatus 1, and be capable of transmitting and receiving information to and from the image pickup apparatus 1 by wired or wireless communication.

The clock section 13 records a date of the image photographed by the photographing section 2. To the image photographed by the image pickup apparatus 1, the date read from the clock section 13 is added as photographing date information.

Now, with reference to flowcharts in FIGS. 4 to 8, the operation of the image pickup apparatus 1 having the above-described configuration will be described.

First, a detailed operation of the subject situation determination section 22 will be described. In the present embodiment, the subject situation determination section 22 performs a 3D effect determination process and a climax determination process.

Figure 4:
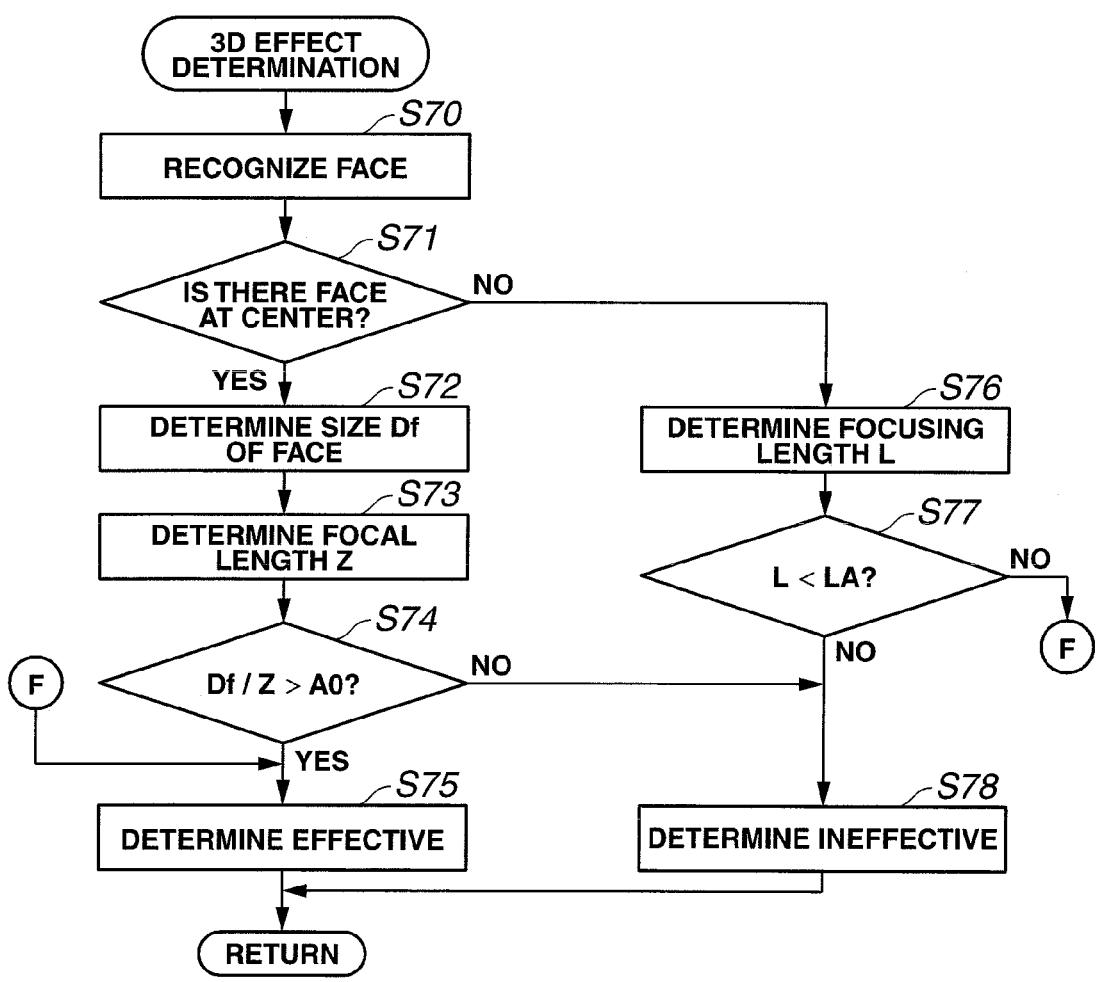
FIG. 4 is a flowchart of a 3D effect determination process.

The 3D effect determination process shown in FIG. 4 is, briefly, a process for determining whether a distance between the image pickup apparatus 1 and a main subject has a suitable relationship with the base line length BL of the photographing section 2 for a stereoscopic display.

For example, when the distance between the image pickup apparatus 1 and the main subject is long, a slight difference, that is, parallax is obtained between the left viewpoint image obtained by the left photographing section 2a and the right viewpoint image obtained by the right photographing section 2b, which makes it difficult to obtain a 3D still image or a 3D moving image that can be effectively stereoscopically displayed.

In the present embodiment, a suitable value LA of the distance between the image pickup apparatus 1 and the main subject is 3 m by way of example in view of the base line length BL that can be set when the image pickup apparatus 1 is sized to be easily carried. The value LA is preferably determined also in view of specifications of a display device that displays a 3D still image or a 3D moving image.

Hereinafter, a case where the distance between the image pickup apparatus 1 and the main subject has a suitable relationship with the base line length BL of the photographing section 2 for a stereoscopic display is referred to as a 3D effect being effective, and a case where the distance has an unsuitable relationship is referred to as a 3D effect being ineffective.

First, in Step S70, the face recognizing section 24 performs a face recognizing process for recognizing the presence of a person's face in the image obtained by the photographing section 2. Then, in Step S71, it is determined whether the person's face is present at a center of the image. Specifically, in Step S71, it is determined whether the person is a main subject.

When it is determined in Step S71 that the person's face is present at the center of the image, the process moves to Step S72. In Steps S72 to S74, it is determined whether a distance between the image pickup apparatus 1 and the main subject has a suitable relationship for a stereoscopic display based on a size Df of the face of the person as the main subject in the image and a focal length Z of the photographing lens of the photographing section 2.

Specifically, in Step S74, when a value obtained by dividing a representative value Df of the size of the face of the person closest to the center in the image, for example, an area or the number of vertical pixels of the person's face by the focal length Z of the photographing lens is larger than a predetermined value A0, it is determined in Step S75 that a 3D effect is effective. When the value obtained by dividing the representative value Df of the size of the person's face by the focal length Z is the predetermined value A0 or lower, it is determined in Step S78 that the 3D effect is ineffective.

In Step S74, the representative value Df of the size of the person's face is divided by the focal length Z because when the face of the person as the main subject in the image is large and the focal length Z is long, the distance between the image pickup apparatus 1 and the person is long, which prevents the 3D effect from being obtained. As in the present embodiment, the representative value Df of the size of the person's face is divided by the focal length Z, thereby eliminating an influence of a change in the focal length Z of the photographing lens.

The predetermined value A0 used for determination is determined in view of the suitable value LA of the distance between the image pickup apparatus 1 and the main subject, a size of the image pickup device of the photographing section 2, or the like.

On the other hand, when it is determined in Step S71 that the person's face is not present at the center of the image, that is, when the main subject is not a person, the process moves to Step S76. In Steps S76 and S77, a subject brought into focus is regarded as a main subject, and it is determined whether the distance between the image pickup apparatus 1 and the main subject has a suitable relationship for a stereoscopic display based on the focusing length L of the photographing lens.

Specifically, in Step S77, when the focusing length L of the photographing lens is less than the suitable value LA of the distance between the image pickup apparatus 1 and the main subject, it is determined in Step S75 that the 3D effect is effective. When the focusing length L of the photographing lens is the suitable value LA or longer of the distance between the image pickup apparatus 1 and the main subject, it is determined in Step S78 that the 3D effect is ineffective.

In the present embodiment, when the person's face is recognized at the center of the image, it is determined whether the 3D effect is effective or ineffective by the size of the person's face in the image, but it may be determined whether the 3D effect is effective or ineffective by the focusing length L of the photographing lens image irrespective of the presence of a person in the image.

Figure 5:
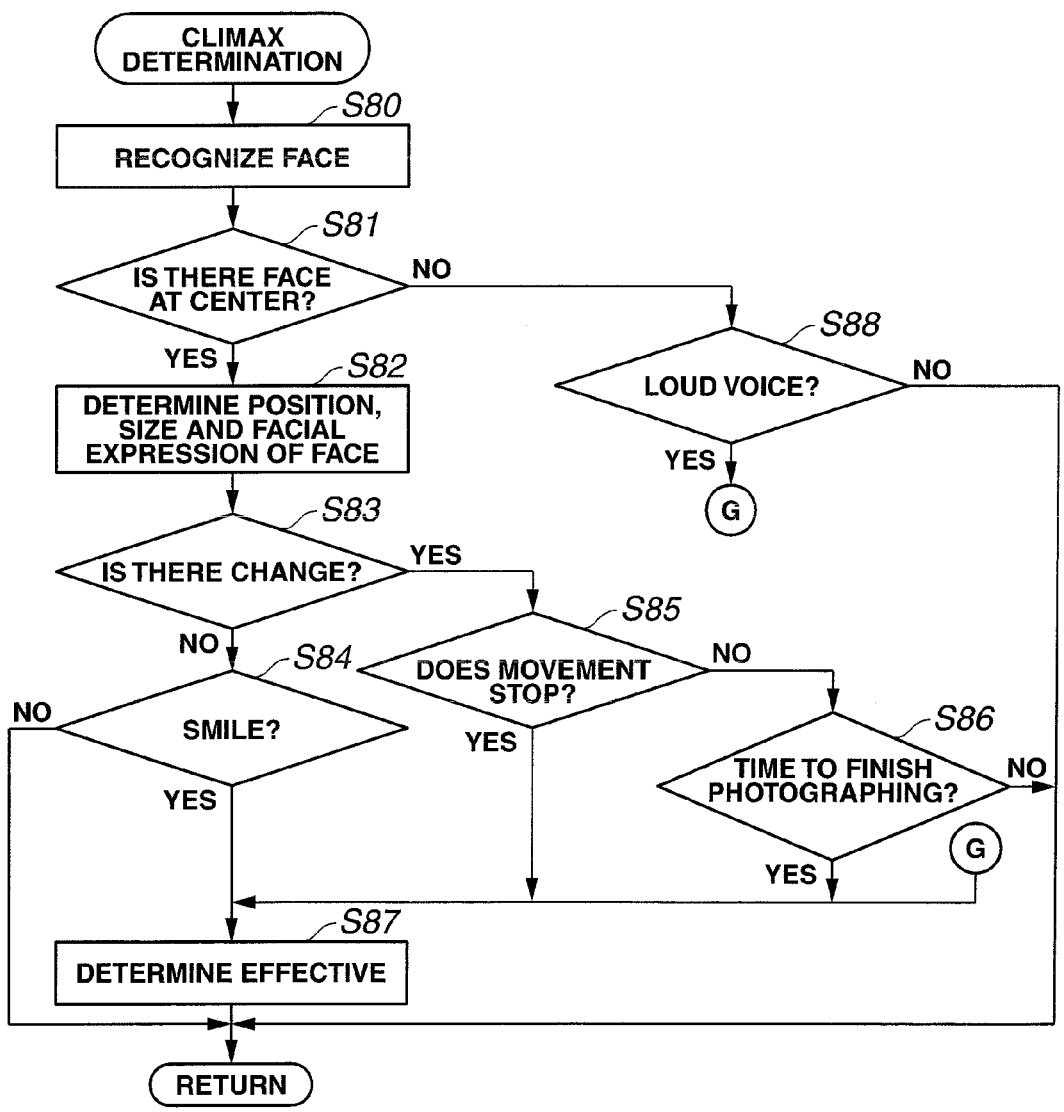
FIG. 5 is a flowchart of a climax determination process.

The climax determination process shown in FIG. 5 is, briefly, a process for determining whether the image photographed by the photographing section 2 shows a suitable scene for a stereoscopic display in photographing a moving image.

For example, when the main subject is a person, an image determined that the 3D effect is effective in the 3D effect determination process, which shows a scene with a person in the image having no facial expression or a scene with a person during a certain action, is sometimes unsuitable for picking out a person's charm by a stereoscopic display.

In the present embodiment, when the main subject is a person, a time when the person changes his/her facial expression is regarded as a scene suitable for a stereoscopic display, and when the main subject is not a person, a time when surrounding voice becomes louder is regarded to be a certain exciting atmosphere occurring around a photographing place and regarded as a scene suitable for a stereoscopic display by way of example. In photographing a moving image, a time immediately before a finish of the photographing is regarded as a scene that a user wants to photograph, that is, a scene to be picked out and regarded as a scene suitable for a stereoscopic display.

Hereinafter, a case where it is determined whether the image photographed by the photographing section 2 shows a scene suitable for a stereoscopic display is referred to as climax determination being effective.

First in Step S80, the face recognizing section 24 performs a face recognizing process for recognizing the presence of a person's face in the image obtained by the photographing section 2. Then, in Step S81, it is determined whether the person's face is present at a center of the image. Specifically, in Step S81, it is determined whether the person is a main subject.

When it is determined in Step S81 that the person's face is present at the center of the image, the process moves to Step S82. In Step S82, the position, size and facial expression of the face of the person as the main subject is determined and converted into numbers.

Then, in Steps S83 to S86, it is determined whether the climax determination is effective based on determination results of the position, size and facial expression of the face of the person as the main subject in the image in the present frame and a predetermined number of previous frames.

Specifically, in Step S83, when there is no change in any of the position, size and facial expression of the person's face in the image, the process moves to Step S84, and it is determined whether the facial expression of the person is a smile. When the facial expression of the person is a smile in Step S84, it is determined that the climax determination is effective.

In Step S83, when there is a change in any of the position, size and facial expression of the person's face in the image, the process moves to Step S85. When the change in the position, size and facial expression of the person's face in the image reaches a predetermined threshold or less, that is, when the person's face stops, it is determined that the climax determination is effective.

In Step S85, even when the change in the position, size and facial expression of the person's face in the image continues, it is determined that the climax determination is effective if the moving image photographing switch 5 is operated to input an instruction to finish photographing a moving image.

On the other hand, when it is determined in Step S81 that the person's face is not present at the center of the image, that is, when the main subject is not a person, the process moves to Step S88. In Step S88, it is determined that the climax determination is effective when the voice inputted from the microphone 3 becomes louder.

Figure 6:
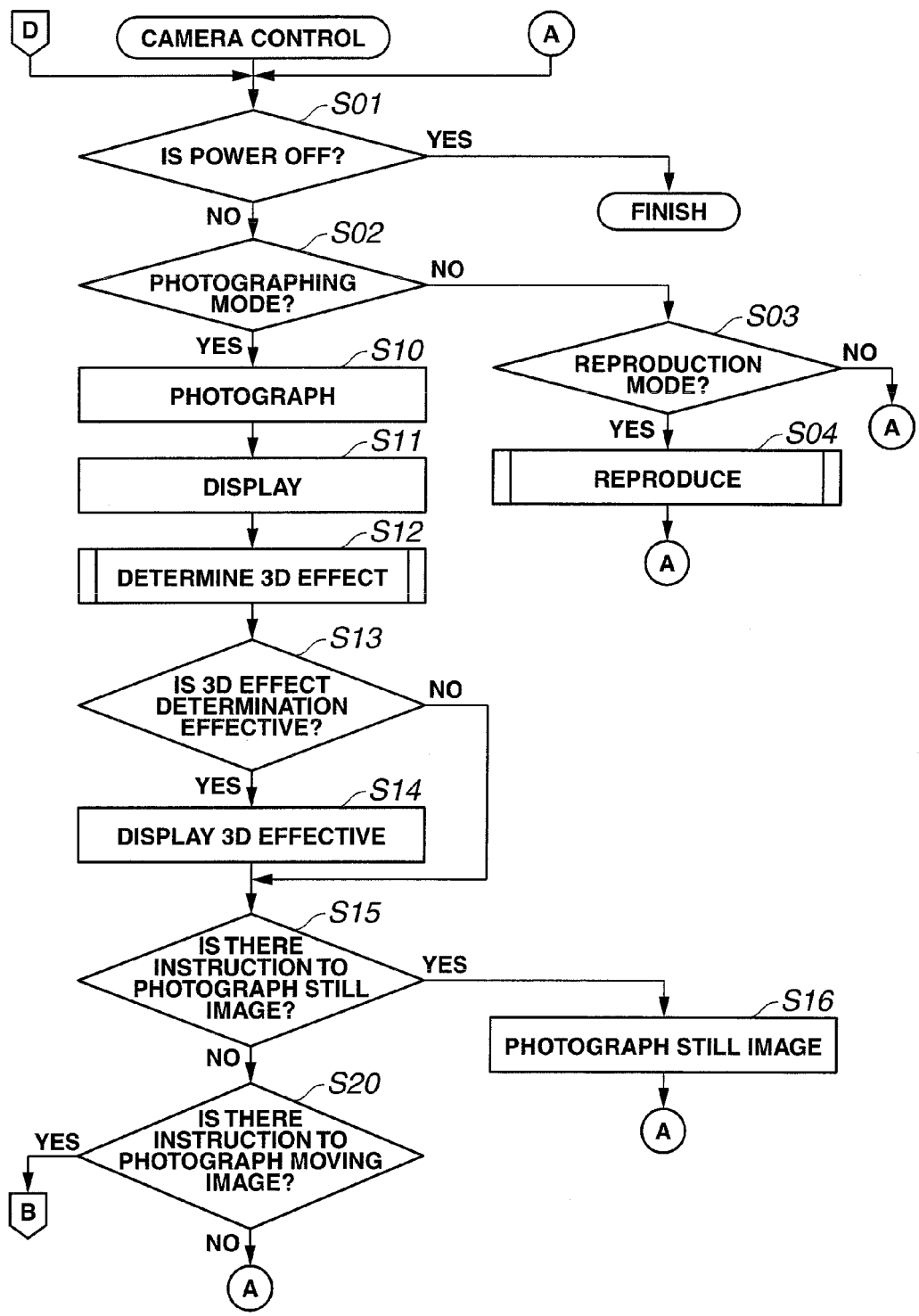
FIG. 6 is a flowchart of a main routine.
Figure 7:
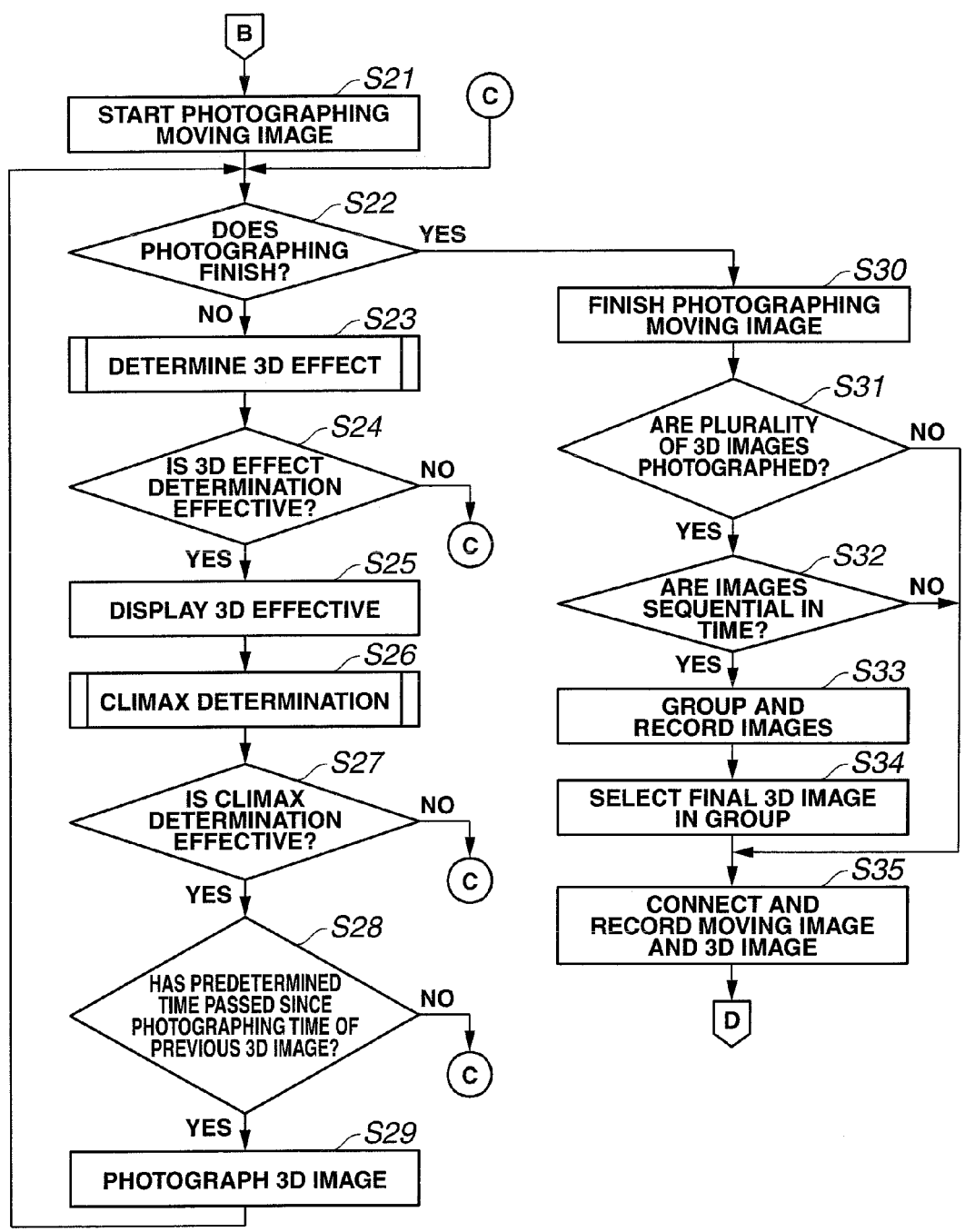
FIG. 7 is a flowchart of the main routine.
Figure 8:
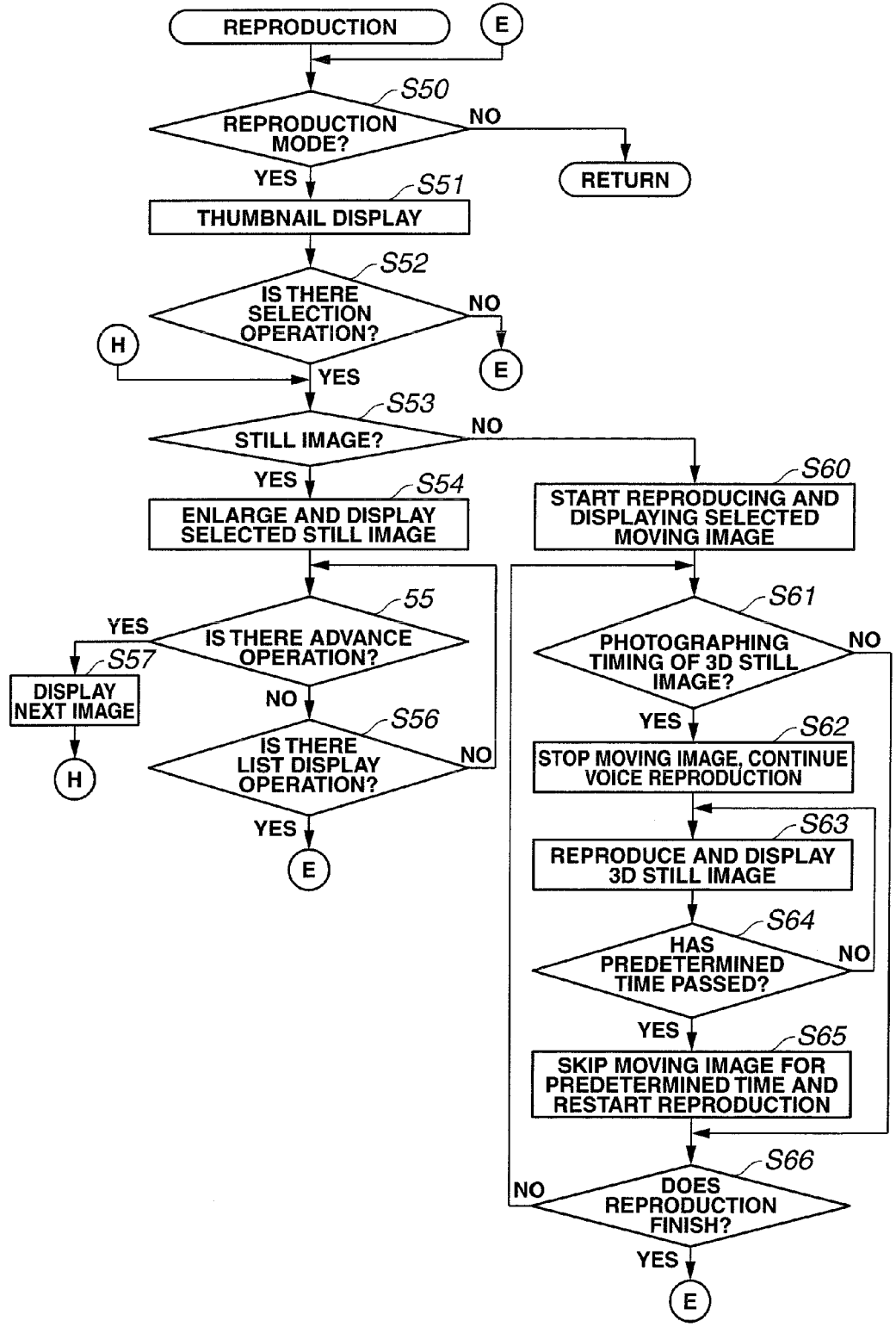
FIG. 8 is a flowchart of a reproduction process.

Next, with reference to FIGS. 6 and 7, a main routine of operation control of the image pickup apparatus 1 will be described. The main routine is started by operating the power switch 6 to power on the image pickup apparatus 1.

First in Step S01, it is determined whether the power switch 6 is operated to input an instruction to power off the image pickup apparatus 1. When it is determined that the instruction to power off the image pickup apparatus 1 is inputted, a finish process such as moving the position of the photographing lens to a predetermined position is performed, and then the image pickup apparatus 1 is powered off.

When it is determined that the instruction to power off the image pickup apparatus 1 is not inputted, the process moves to Step S02, and it is determined whether an operation mode of the image pickup apparatus 1 is set to a photographing mode.

When it is determined in Step S02 that the operation mode is not set to the photographing mode, it is determined in Step S03 whether the operation mode of the image pickup apparatus 1 is set to a reproduction mode. When it is determined in Step S03 that the operation mode is not set to the reproduction mode, the presence of an abnormality in setting of the operation mode is displayed on the image display section 10, and the process returns to Step S01. When it is determined in Step S03 that the operation mode is set to the reproduction mode, a reproduction process described later in detail is performed in Step S04.

When it is determined in Step S02 that the operation mode is set to the photographing mode, the process moves to Step S10. In Steps S10 and S11, a latest through image of the subject referred to as a so-called live view is displayed on the image display section 10. Specifically, in Step S10, photographing is performed by at least one of the left photographing section 2a and the right photographing section 2b of the photographing section 2, and the image is displayed on the image display section 10 in Step S11.

Then in Step S12, the 3D effect determination process described with reference to FIG. 4 is performed. Specifically, it is determined whether the 3D effect is effective for the image photographed in Step S10.

When it is determined in Step S12 that the 3D effect is effective, in Step S14, it is displayed on the image display section 10 that a 3D still image for an effective stereoscopic display can be photographed. The 3D effect being effective may be outputted by sound. In Step S10, when photographing is performed by both the left photographing section 2a and the right photographing section 2b, in Step S14, the left viewpoint image and the right viewpoint image may be simultaneously displayed on the image display section 10 for a 3D display.

Then in Steps S15 and S20, it is determined whether the user inputs an instruction to photograph a still image or a moving image. When it is determined that the instruction to photograph a still image or a moving image is not inputted, the process returns to Step S01.

When it is determined in Step S15 that the user operates the still image photographing switch 4 to input an instruction for a photographing operation of a 2D still image or a 3D still image, the process moves to Step S16, and the photographing section 2 photographs the 2D still image or the 3D still image and records the image in the recording section 12. In Step S16, which of the 2D still image and the 3D still image is photographed and recorded depends on an operation condition preliminarily set by the user.

The photographing control section 23 may automatically switch the operation of the photographing section 2 so as to photograph a 3D still image when the 3D effect is effective, and photograph a 2D still image with only one of the left photographing section 2a and the right photographing section 2b when the 3D effect is ineffective. With such a configuration, one of the left photographing section 2a and the right photographing section 2b that is not used for photographing can be stopped when the 3D effect is ineffective, thereby reducing power consumption. A recording capacity of the recording section 12 can be also saved.

When it is determined in Step S20 that the user operates the moving image photographing switch 5 to input an instruction to start a photographing operation of a moving image, the process moves to Step S21, and photographing and recording of a 2D moving image are started.

In the photographing operation of the 2D moving image, as shown in Step 22, processes in Steps S23 to S28 are repeated until the moving image photographing switch 5 is operated again to input an instruction to finish the photographing operation of the moving image.

Specifically, in Step S23, the 3D effect determination process described with reference to FIG. 4 is performed. Specifically, it is determined whether a 3D effect of a photographed latest image (frame) is effective. When it is determined in Step S23 that the 3D effect is ineffective, the process returns to Step S22.

When it is determined in Step S23 that the 3D effect is effective, in Step S25, it is displayed on the image display section 10 that a 3D still image for an effective stereoscopic display can be photographed.

Then, in Step S26, the climax determination process described with reference to FIG. 5 is performed. Specifically, it is determined whether the photographed latest image (frame) shows a scene suitable for a stereoscopic display. When the climax determination is ineffective in Step S26, the process returns to Step S22.

When the climax determination is effective in Step S26, it is determined in Step S28 whether a predetermined time has passed since a photographing time of the previous still image. When the predetermined time has passed since the photographing time of the previous still image, the photographing section 2 photographs a 3D still image and records the image in the recording section 12. When the predetermined time has not passed since the photographing time of the previous still image, the process returns to Step S22.

The determination in Step S26 is performed to prevent overlaps of 3D still images having the same composition by photographing the 3D still images at sequential timing. For example, a predetermined time for the determination in Step S26 is about ⅓ to 1 second.

The above-described operation is repeated simultaneously with the photographing and recording operations of the 2D moving image until it is determined in Step S22 that the instruction to finish the photographing operation of the 2D moving image is inputted. When it is determined in Step S22 that the instruction to finish the photographing operation of the 2D moving image is inputted, the process moves to Step S30, and photographing of the 2D moving image is finished.

In Step S31, it is determined whether a plurality of 3D still images are photographed in Step S29 during photographing of the present 2D moving image. When only one 3D still image is photographed, the process moves to Step S35, a photographing time of the 2D moving image and photographing timing of the 3D still image are connected to record a relationship between the 2D moving image and the 3D still image.

When it is determined in Step S31 that the plurality of 3D still images are photographed in Step S29, the process moves to Step S32, and it is determined whether there are images among the plurality of 3D still images, which are photographed sequentially at a shorter time interval than a predetermined time interval. The predetermined interval herein is, for example, about 3 to 10 seconds.

In Step S32, when there is no 3D still image photographed sequentially at a shorter time interval than the predetermined time interval, the process moves to Step S35, the photographing time of the 2D moving image and photographing timing of all the 3D still images are connected to record a relationship between the 2D moving image and the 3D still images.

In Step S32, when there is an image group including a plurality of 3D still images photographed sequentially at a shorter time interval than the predetermined time interval, the process moves to Step S33, and the image group is recorded. Then, in Step S34, a 3D still image finally photographed in the image group is selected as a representative.

Then in Step S35, the photographing time of the 2D moving image is connected to photographing timing of all the 3D still images that are not grouped and photographing timing of the image group to record a relationship between the 2D moving image and the 3D still images.

The above is the description on the operation in the photographing mode of the image pickup apparatus 1 of the present embodiment. Next, with reference to FIG. 8, a reproduction process performed when it is determined in Step S03 that the operation mode is set to the reproduction mode will be described.

As shown in Step 50, the reproduction process is performed during a period when the operation mode of the image pickup apparatus 1 is set to the reproduction mode. In the reproduction process, first in Step S51, a list of still images and moving images recorded in the recording section 12 is displayed on the image display section 10 as a so-called thumbnail display.

When the user inputs an instruction to select a still image or a moving image with the operation member, it is determined in Step S53 whether the selected image is the still image or the moving image.

When the still image is selected, in Step S54, the selected still image is enlarged and displayed on the image display section 10. When it is determined that the user operates the cross switch 9 or the like to input an advance instruction (YES in Step S55), it is determined that a next still image or moving image is selected, and the process returns to Step S53. When it is determined that the user operates the zoom operation switch 8 or the like to input an instruction for a list display (YES in Step S56), the process returns to Step S50.

When it is determined in Step S53 that the user selects the moving image, in Step S60, the selected moving image is reproduced and displayed on the image display section 10.

When the moving image is the 2D moving image and the 3D still image connected in Step S35 described above is recorded in the recording section 12 during reproduction of the moving image, the processes from Step S61 to S65 are performed.

In the present embodiment, when photographing timing of the connected 3D still image is reached (YES in Step S61) in reproducing the 2D moving image, the corresponding 3D still image is reproduced and displayed for a predetermined reproduction time on the image display section 10. The voice recorded in the 2D moving image is reproduced without being stopped during the display of the 3D still image and outputted from the speaker 7. The predetermined reproduction time for reproducing and displaying the 3D still image is, for example, about 3 seconds.

After the 3D still image is displayed and the predetermined reproduction time has passed (YES in Step S64), the 2D moving image is again skipped and reproduced for the predetermined reproduction time and displayed on the image display section 10.

Next, an actual operation of the image pickup apparatus 1 of the present embodiment described above will be described below. Hereinafter, for example, at a photographing time t=0, the moving image photographing switch 5 is operated to photograph and record the 2D moving image shown in FIG. 9. A left side in FIG. 9 shows changes in scenes of the 2D moving image, and shows a state where the image pickup apparatus 1 captures a person as a main subject and approaches the person from the photographing time t=0 to t=2.

Figure 9:
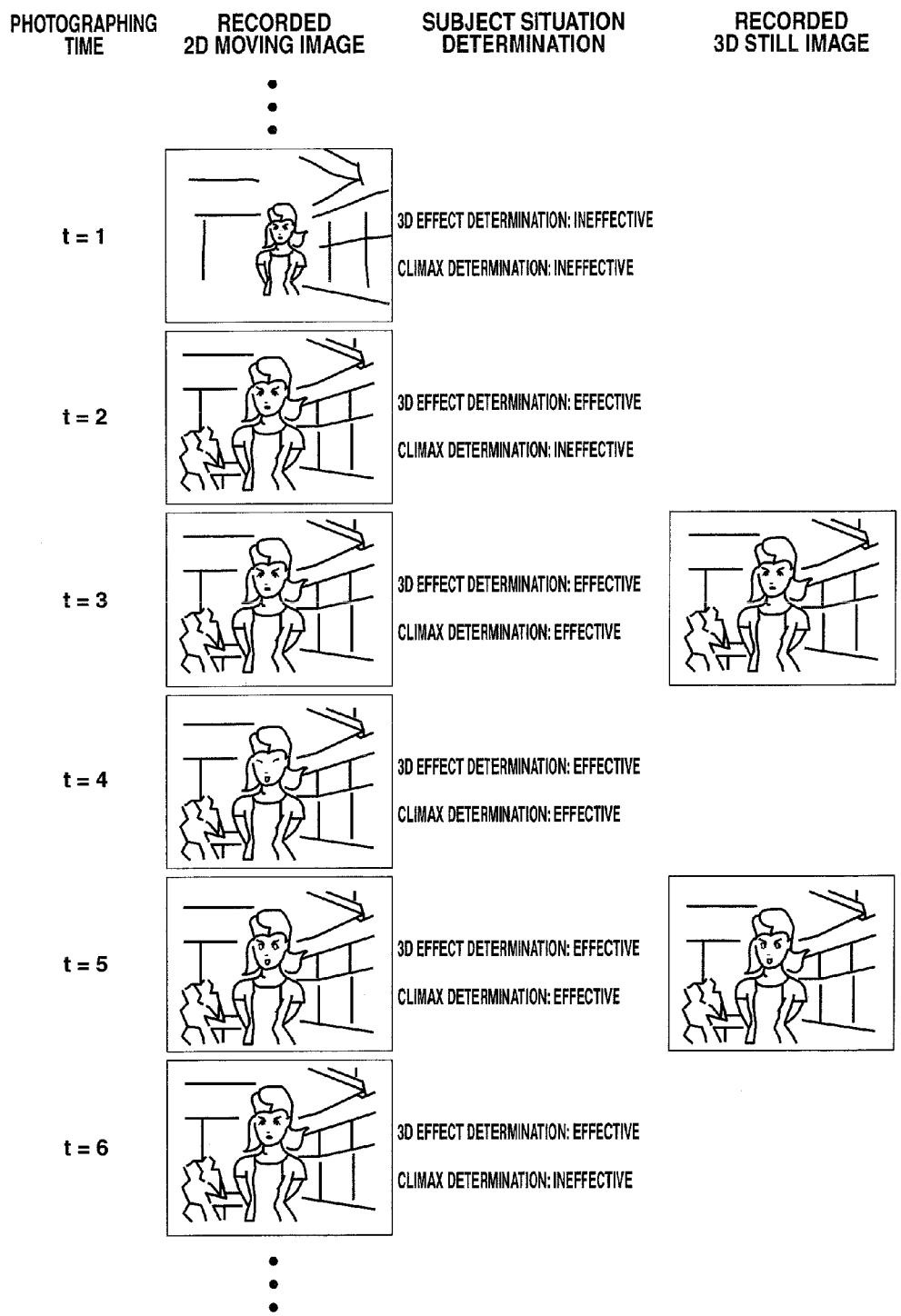
FIG. 9 illustrates an operation in photographing a 2D moving image.

In the scene at the photographing time t=1 in FIG. 9, the person's face is captured at the center of the image, but a distance between the image pickup apparatus 1 and the person is longer than the suitable value LA. Thus, the result of the 3D effect determination process by the subject situation determination section 22 is ineffective.

In the scenes at the photographing time t=2 and thereafter, the person's face is captured at the center of the image, and the distance between the image pickup apparatus 1 and the person is less than the value LA. Thus, in the scenes at the photographing time t=2 and thereafter, the result of the 3D effect determination process by the subject situation determination section 22 is effective.

In the scene at the photographing time t=3, the size of the person's face changes and then the change of the person's face stops, and thus the result of the climax determination process is effective and a 3D still image is photographed (Step S29).

In the next scene at the photographing time t=4, the facial expression of the person is a smile, and thus the result of the climax determination process is effective. However, a predetermined time has not passed since the photographing of the previous 3D still image at the photographing time t=3, and thus the 3D still image is not photographed (NO in Step S28).

In the next scene at the photographing time t=5, the facial expression of the person is a smile, and the result of the climax determination process is effective. Also, the predetermined time has passed since the photographing of the previous 3D still image at the photographing time t=3, the 3D still image is photographed (Step S29). In the scene at the photographing time t=6, the facial expression of the person is not a smile, and the facial expression of the person's face is being changed, and thus the result of the climax determination process is ineffective.

The two 3D still images photographed at the photographing times t=3 and t=5 are sequentially photographed at a shorter time interval than a predetermined time interval, and is thus connected to the 2D moving image as one image group and recorded in the recording section 12. Then, the 3D still image at the photographing time t=5 finally photographed in the image group is recorded as a representative.

Figure 10:
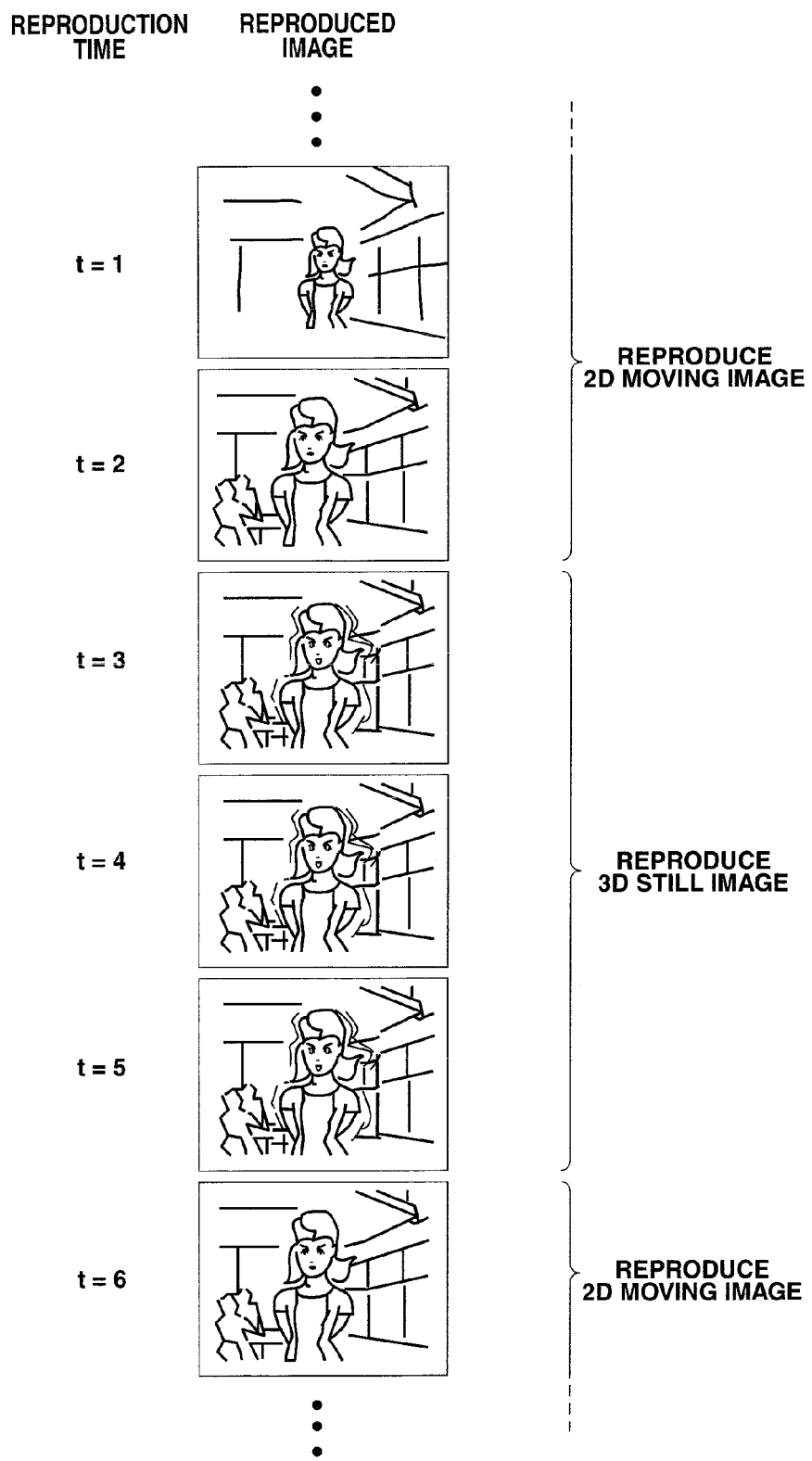
FIG. 10 illustrates an operation in reproducing the 2D moving image.

Next, an operation when the 2D moving image in FIG. 9 described above is reproduced in the reproduction mode will be described with reference to FIG. 10. FIG. 10 shows the display on the image display section 10 when the 2D moving image in FIG. 9 is reproduced.

In the reproduction of the 2D moving image, a time before the reproduction time t=2 is not photographing timing of the connected 3D still image, and thus the 2D moving image is reproduced and displayed. At the reproduction time t=3, the photographing timing of the connected 3D still image is reached, and thus the 3D still image as a representative in the image group photographed at this timing is displayed on the image display section 10. The 3D still image as the representative is the 3D still image photographed at the photographing time t=5. After the predetermined reproduction time has passed (after reproduction time t=6), the 2D moving image is again displayed on the image display section 10.

As described above, the image pickup apparatus 1 of the present embodiment can automatically photograph a 3D still image in a scene having a high stereoscopic display effect and suitable for a stereoscopic display in photographing a 2D moving image.

The image pickup apparatus 1 of the present embodiment can automatically insert a display of a 3D still image having a high stereoscopic display effect only in a required position suitable for a stereoscopic display in reproducing the photographed 2D moving image.

Thus, the image pickup apparatus 1 of the present embodiment can suitably switch between the 2D moving image and the 3D still image to provide impressive performance expression that can enhance a feeling of "being there" by a stereoscopic display.

A viewer who views a 3D moving image for long hours may have fatigue or discomfort of the eyes, but in the present embodiment, the 3D still image is displayed in the middle of the 2D moving image, thereby preventing fatigue or discomfort of the eyes of the viewer.

In the present embodiment, the 3D still image is automatically photographed in a scene having a high stereoscopic display effect and suitable for a stereoscopic display in photographing the 2D moving image, but the image pickup apparatus 1 may automatically photograph a 3D moving image only in a predetermined period in a scene having a high stereoscopic display effect and suitable for a stereoscopic display in photographing the 2D moving image. Specifically, when the 3D effect determination and the climax determination are effective in photographing the 2D moving image, the image pickup apparatus 1 may photograph a 3D moving image of, for example, about 2 to 5 seconds.

In the list display (thumbnail display) in Step S51 in the reproduction process, a 3D still image automatically photographed in photographing the moving image and reduced in size may be used as a reduced-size image (thumbnail) for searching a moving image. With such a configuration, an impressive scene with the 3D effect determination and the climax determination being effective is displayed as the reduced-size image for searching the moving image, and thus the user can easily find a target moving image.

In the above-described embodiment, the image pickup apparatus 1 includes the pair of left photographing section 2a and right photographing section 2b corresponding to the two viewpoints, but for example, the present invention may be applied to a configuration in which two image pickup apparatuses each having a single photographing section are used in combination, and the two image pickup apparatuses are substantially synchronously operated by wired or wireless communication.

(Second Embodiment)

In the climax determination process shown in FIG. 5 of the first embodiment, the climax determination is performed based on the subject and the surrounding state of the subject such as the facial expression of the person or the volume of surrounding voice, but the climax determination may reflect a photographing intention of a user (photographer) of the image pickup apparatus 1.

Now, as an image pickup apparatus of a second embodiment, an image pickup apparatus in which such a user's intention is incorporated into climax determination will be described with reference to FIGS. 11 and 12. The second embodiment is different from the first embodiment only in the climax determination process. Only the difference will be described below, and the same components as in the first embodiment are denoted by the same reference numerals and descriptions thereof will be omitted.

Figure 11:
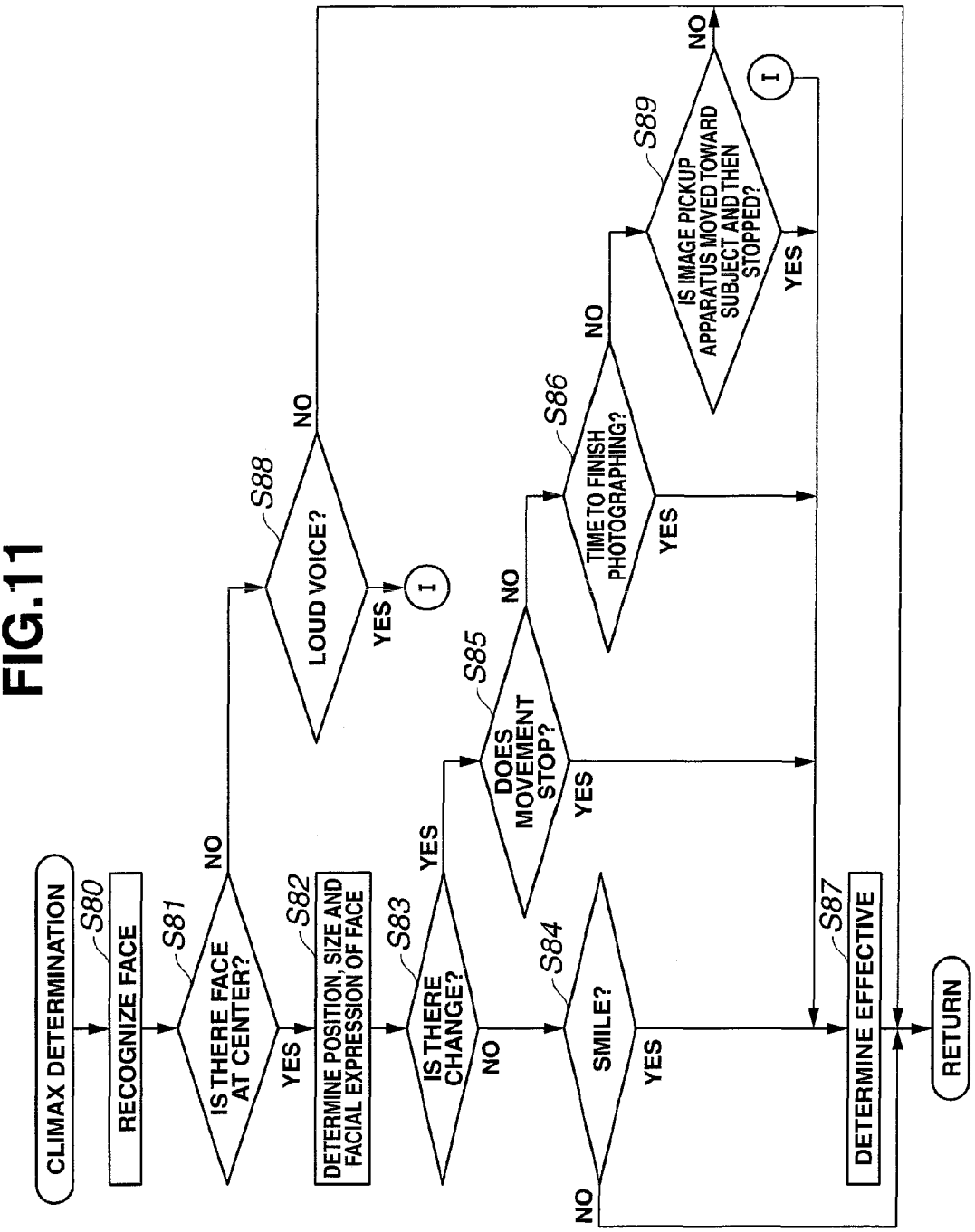
FIG. 11 is a flowchart of a climax determination process in a second embodiment.

As shown in the flowchart in FIG. 11, the climax determination process in the present embodiment is different from the climax determination process in the first embodiment in that Step S89 is added after No determination in Step S86.

In Step S89, it is determined whether the image pickup apparatus 1 is moved toward the subject and then stopped with respect to the subject. The movement of the image pickup apparatus 1 toward the subject can be detected, for example, by determining whether a movement vector of an image is radially generated. The movement of the image pickup apparatus 1 toward the subject can be also detected based on an output of an acceleration sensor provided in the image pickup apparatus.

In Step S89, when it is determined that the image pickup apparatus 1 is moved toward the subject and then stopped with respect to the subject, the climax determination is determined to be effective.

Figure 12:
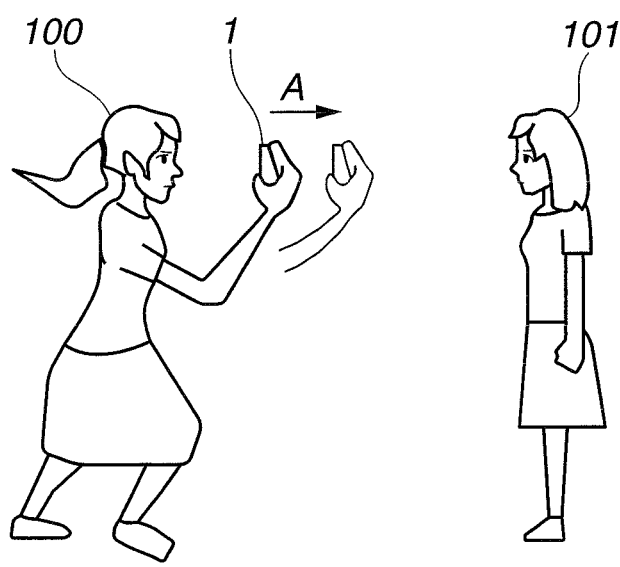
FIG. 12 shows an operation for making climax determination effective.

In the present embodiment with Step S89 added to the climax determination process, as shown in FIG. 12, when the user 100 pushes and moves the image pickup apparatus 1 toward the subject 101 and then stops and holds the image pickup apparatus 1 in a predetermined position, the climax determination becomes effective, and a 3D image is photographed.

Thus, in the present embodiment, the user's intention can be incorporated into the climax determination, and photographing reflecting user's performance intention can be performed.

(Third Embodiment)

Figure 13:
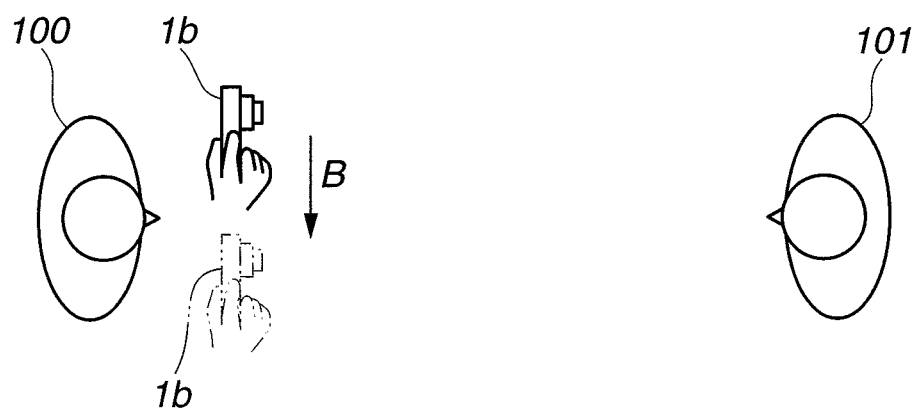
FIG. 13 shows an operation for photographing a 3D image using an image pickup apparatus of a third embodiment.

In the above-described embodiment, the image pickup apparatus 1 includes the pair of left photographing section 2a and right photographing section 2b corresponding to the two viewpoints, but for example, as shown in FIG. 13, the present invention may be applied to a configuration in which one image pickup apparatus 1b including a photographing section with a single viewpoint is used, and a subject 101 is photographed from a plurality of viewpoints while the image pickup apparatus 1b is being moved.

A third embodiment in which the present invention is applied to an image pickup apparatus 1b including a photographing section with a single viewpoint will be described with reference to FIGS. 13 to 18. In the present embodiment, a user 100 performs photographing while moving the image pickup apparatus 1b including the photographing section with the single viewpoint from left to right with respect to the subject 101 as shown by an arrow B in FIG. 13 by way of example.

Figure 14:
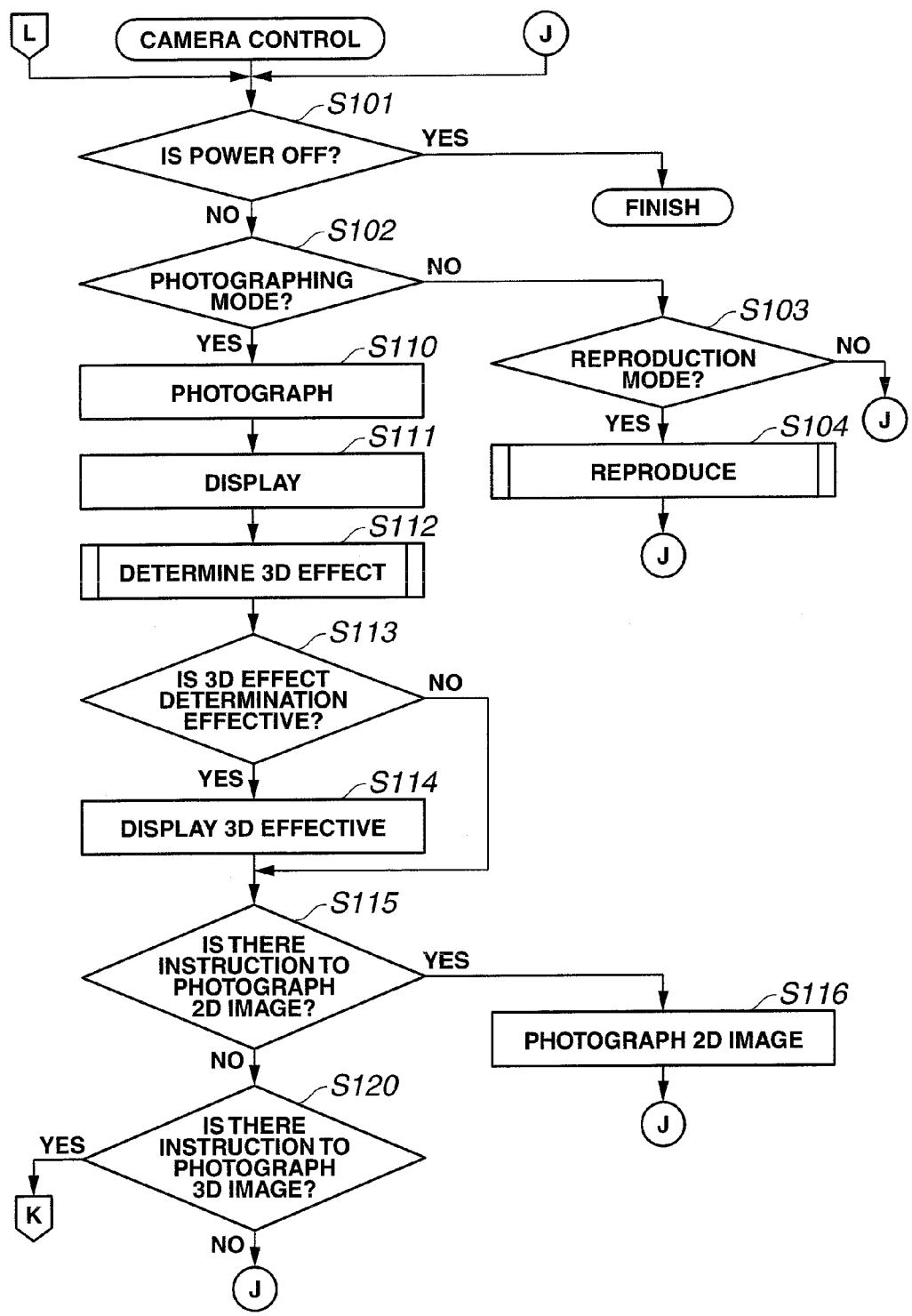
FIG. 14 is a flowchart of a main routine in the third embodiment.
Figure 15:
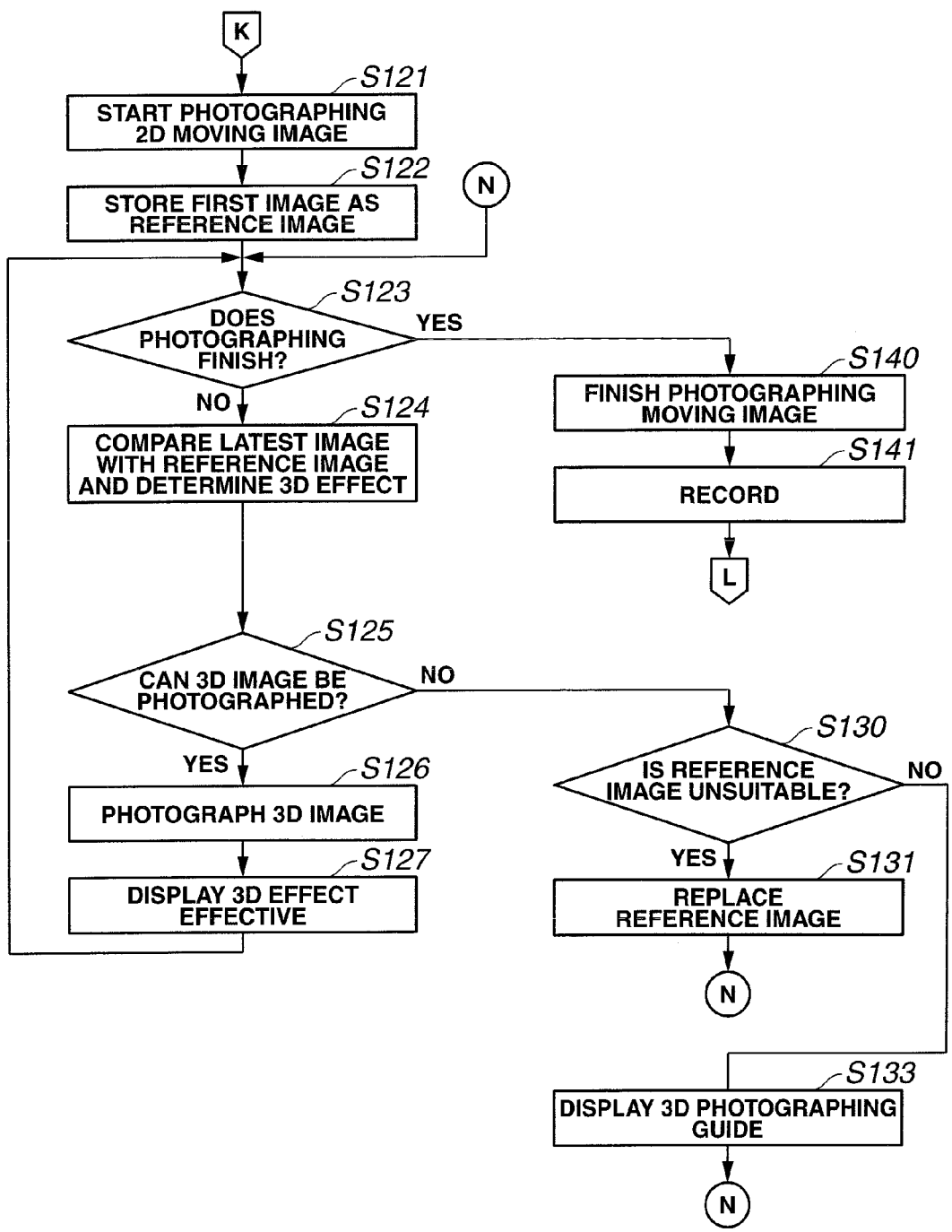
FIG. 15 is a flowchart of the main routine in the third embodiment.

A main routine of operation control of the image pickup apparatus 1b of the present embodiment will be described with reference to the flowcharts in FIGS. 14 and 15. The main routine is started by the image pickup apparatus 1b being powered on.

First in Step S101, it is determined whether an instruction to power off the image pickup apparatus 1b is inputted. When it is determined that the instruction to power off the image pickup apparatus 1b is inputted, a finish process such as moving a position of a photographing lens to a predetermined position is performed, and then the image pickup apparatus 1b is powered off.

On the other hand, when it is determined that the instruction to power off the image pickup apparatus 1b is not inputted, the process moves to Step S102, and it is determined whether an operation mode of the image pickup apparatus 1b is set to a photographing mode.

When it is determined in Step S102 that the operation mode is not set to the photographing mode, in Step S103, it is determined whether the operation mode of the image pickup apparatus 1b is set to a reproduction mode. When it is determined in Step S103 that the operation mode is not set to the reproduction mode, the presence of an abnormality in setting of the operation mode is displayed on the image display section, and the process returns to Step S101. When it is determined in Step S03 that the operation mode is set to the reproduction mode, a reproduction process is performed in Step S104.

When it is determined in Step S102 that the operation mode is set to the photographing mode, the process moves to Step S110. In Steps S110 and S111, a latest through image of the subject referred to as a so-called live view is displayed on the image display section. Specifically, in Step S110, photographing is performed by the photographing section, and the image is displayed on the image display section in Step S111.

Then in Step S112, the 3D effect determination process described with reference to FIG. 4 is performed. Specifically, it is determined whether the 3D effect is effective for the image photographed in Step S10.

When it is determined in Step S112 that the 3D effect is effective, in Step S114, it is displayed on the image display section that a 3D still image for an effective stereoscopic display can be photographed.

Then in Steps S115 and S120, it is determined whether the user inputs an instruction to photograph a 2D image or a 3D image. When it is determined that the instruction to photograph a 2D image or a 3D image is not inputted, the process returns to Step S101.

In Step S115, when it is determined that the instruction for a photographing operation of a 2D image is inputted, the process moves to Step S116, and the photographing section photographs the 2D image and records the image in the recording section.

When it is determined in Step S120 that an instruction to start the photographing operation of the 3D image is inputted, the process moves to Step S121, and photographing and recording of a 2D moving image are started. Then in Step S122, an image of a frame first obtained is stored as a reference image. The photographing operation of the 2D moving image is repeated until an instruction to finish the photographing operation is inputted as shown in Step S123.

In the photographing operation of the 2D moving image, first in Step S124, the obtained latest image is compared with the reference image, and it is determined whether a combination of the latest image and the reference image can obtain a 3D image that can be 3D displayed.

In Step S124, it is determined that the 3D image can be photographed when the latest image and the reference image are images of the same subject photographed from different viewpoints with parallax, and there is no change in the subject.

For example, as shown in FIG. 13, when the subject 101 is a person, and there is no change in size and facial expression of the face of the subject 101 in the latest image and the reference image, and a viewpoint of the latest image and a viewpoint of the reference image are substantially horizontally apart from each other, it is determined that the 3D image can be photographed.

The positions of the viewpoint of the latest image and the viewpoint of the reference image can be determined, for example, by determining that the viewpoint of the latest image and the viewpoint of the reference image are substantially horizontally apart from each other when there is no change in vertical position of the face of the subject 101 in the latest image and the reference image and the position of a background with respect to the face of the subject 101 laterally moves.

The determination whether the 3D image can be photographed in Step S124 may be based on a movement vector of the image pickup apparatus 1b calculated from an output of a movement detection device such as an acceleration sensor or an angular acceleration sensor provided in the image pickup apparatus 1b other than the above-described comparison of the image.

When it is determined in Step S124 that the 3D image can be photographed (YES in Step S125), in Step S126, the latest image and the reference image are connected and recorded as a 3D image. Then in Step S127, it is displayed on the image display section that the 3D image is photographed.

On the other hand, when it is determined in Step S124 that the 3D image cannot be photographed (NO in Step S125), in Step S130, it is determined which of the latest image and the reference image is suitable as an image used for a 3D image.

For example, when the facial expression of the subject 101 changes to a smile in the determination of Step S124, it is determined that the latest image with the smile is suitable for an image that constitutes the 3D image, and the present reference image is unsuitable.

When it is determined that the present reference image is unsuitable for an image used for the 3D image (YES in Step S130), in Step S131, the latest image is stored as a new reference image, and the process returns to Step S123.

When it is determined that the present reference image is suitable for an image used for the 3D image (NO in Step S130), in Step S133, a 3D photographing guide that suggests the user 100 an operation method for photographing a 3D image is displayed on the image display section.

Figure 16:
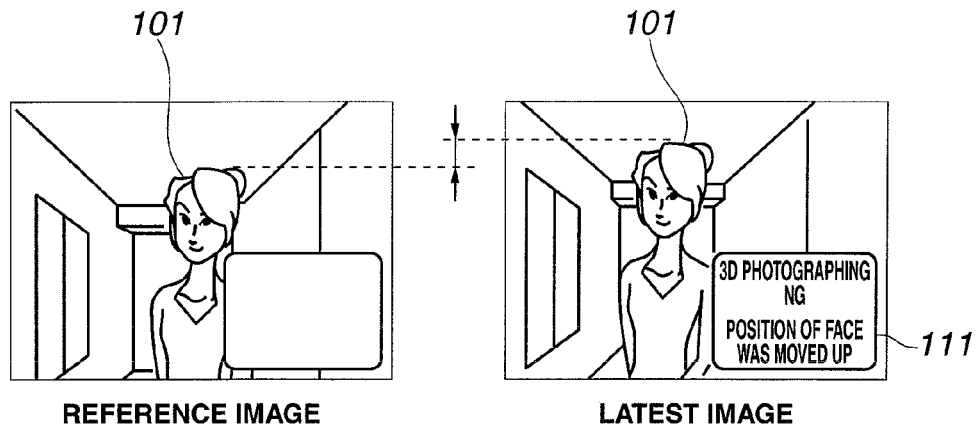
FIG. 16 illustrates a 3D photographing guide display.

In Step S133, it is determined which movement of the image pickup apparatus 1b allows 3D image photographing, for example, from the comparison result between the reference image and the latest image, and the direction of the movement is displayed on the image display section as a 3D photographing guide. For example, as shown in FIG. 16, when the position of the face of the subject 101 is moved up with respect to the reference image, the fact is displayed as a 3D photographing guide 111.

The above-described operation is repeated until it is determined in Step S123 that the instruction to finish the photographing operation is inputted. When it is determined in Step S123 that the instruction to finish the photographing operation is inputted, the process moves to Step S140, and photographing of the 2D moving image is finished.

Next, an operation example of 2D moving image photographing in Step S121 and thereafter of the image pickup apparatus 1b of the present embodiment as described above will be described.

As shown by a solid line in FIG. 13, when the user 100 first holds the image pickup apparatus 1b on the left with respect to the subject 101 and inputs an instruction to photograph a 2D moving image, an image first obtained is stored as a reference image (Step S122).

Figure 17:
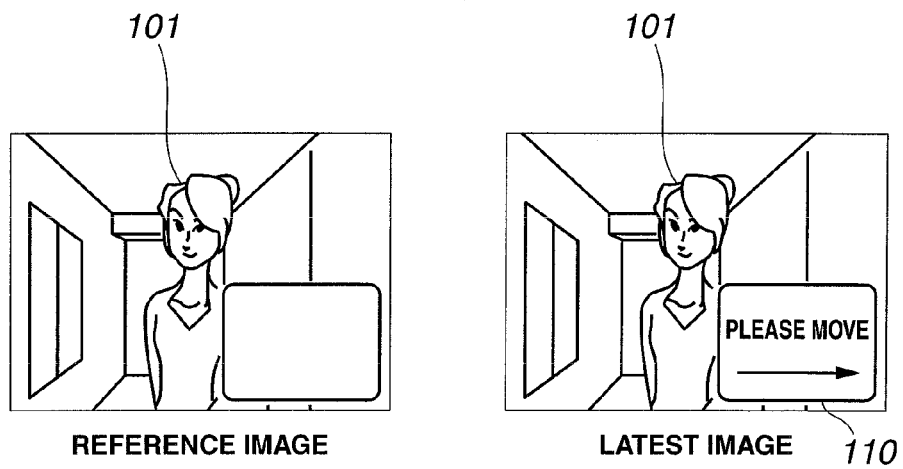
FIG. 17 shows a state at start of 2D moving image photographing.

When the user 100 does not move the image pickup apparatus 1b, as shown in FIG. 17, the photographed latest frame image is the same as the reference image, and thus the 3D image cannot be constituted by a combination of the latest frame image and the reference image (NO in Step S125). Thus, a 3D photographing guide display 110 to instruct to move the image pickup apparatus 1b to the right is displayed together with the latest image on the image display section.

Figure 18:
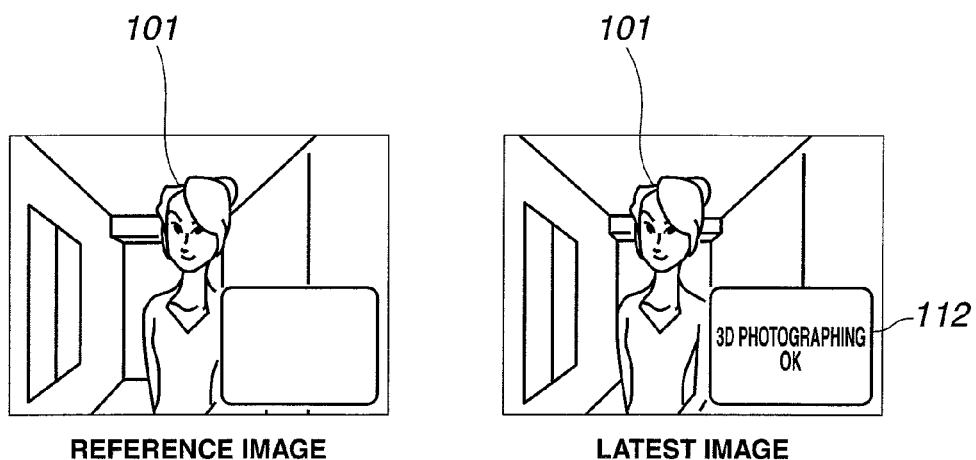
FIG. 18 shows a state where a 3D image is photographed.

When the user 100 moves the image pickup apparatus 1b substantially horizontally to the right, as shown in FIG. 18, the latest frame image has parallax with respect to the reference image, and the 3D image can be constituted by the combination of the latest frame image and the reference image (YES in Step S125). In this case, the combination of the reference image and the latest image is recorded as a 3D still image in the recording section (Step S126). Then, it is displayed on the image display section that the 3D image is photographed (Step S127, reference numeral 112 in FIG. 18).

As described above, when the image pickup apparatus 1b of the present embodiment photographs a 2D moving image while moving with respect to the subject, and there is a combination that can constitute the 3D still image in each frame of the 2D moving image, the combination is recorded as a 3D still image.

Thus, the image pickup apparatus 1b of the present embodiment can automatically photograph the 3D still image inserted into the 2D moving image to provide impressive performance expression that can enhance a feeling of "being there" by a stereoscopic display.

In the image pickup apparatus 1b of the present embodiment, as a reduced-size image (thumbnail) for searching a 2D moving image, one of the images that constitute the 3D still image automatically photographed in photographing the 2D moving image and is reduced in size may be used. With such a configuration, an impressive scene in the 2D moving image is displayed as a reduced-size image for searching the moving image, and thus the user can easily find a target moving image.

The present invention is not limited to the above-described embodiment, but may be changed within the gist or the idea of the invention read from claims and the entire specification, and an image pickup apparatus with such a change is included in the technical scope of the present invention.

For example, the present invention may be applied to electronic equipment having a photographing function such as a recording device, a cell phone, a PDA, a personal computer, a game machine, a digital media player, a television, a GPS, a clock, or the like, not limited to a so-called digital camera as the image pickup apparatus described in the embodiment.

What is claimed is:

1. An image pickup apparatus comprising:
a photographing section that can photograph a subject from a plurality of viewpoints with parallax, and can photograph a 2D moving image of the subject obtained by photographing from at least one of the viewpoints and a 3D image of the subject obtained by photographing from the plurality of the viewpoints;
a recording section that records the 2D moving image and the 3D image;
a subject situation determination section that determines a timing suitable for photographing the 3D image while photographing the 2D moving image; and
a photographing control section that controls the photographing section so as to photograph the 3D image when the subject situation determination section determines that the timing is suitable for photographing the 3D image,
wherein the subject situation determination section calculates a distance between the subject and the photographing section from a focusing length of the photographing section, and determines the timing suitable for photographing the 3D image when the distance between the subject and the photographing section is less than a predetermined distance.

2. The image pickup apparatus according to claim 1, further comprising a face recognizing section that recognizes a size of a person's face in the 2D moving image by image processing,
wherein the subject situation determination section calculates the distance between the subject and the photographing section based on the size of the person's face in the 2D moving image and a focal length of the photographing section.

3. The image pickup apparatus according to claim 2, wherein the face recognizing section can determine a facial expression of the person's face in the 2D moving image, and
the subject situation determination section determines the timing suitable for photographing the 3D image based on a change in the facial expression of the person's face in the 2D moving image.

4. The image pickup apparatus according to claim 1, further comprising a face recognizing section that recognizes a size of a person's face in the 2D moving image by image processing,
wherein the subject situation determination section calculates the distance between the subject and the photographing section based on the size of the person's face in the 2D moving image and a focal length of the photographing section.

5. The image pickup apparatus according to claim 4, wherein the face recognizing section can determine a facial expression of the person's face in the 2D moving image, and the subject situation determination section determines the timing suitable for photographing the 3D image based on a change in the facial expression of the person's face in the 2D moving image.

6. An image pickup apparatus comprising:

a photographing section that can photograph a subject from a plurality of viewpoints with parallax, and that can photograph (1) a 2D moving image of the subject obtained by photographing from at least one of the plurality of viewpoints and (2) a 3D image of the subject obtained by photographing from the plurality of the viewpoints;

a recording section that records the 2D moving image in connection with a group of 3D images including the 3D image;

a subject situation determination section that determines a timing suitable for photographing the 3D image while photographing the 2D moving image; and a photographing control section that (1) controls the photographing section to photograph the 3D image responsive to a determination, by the subject situation determination section, that the timing is suitable for photographing the 3D image, and (2) otherwise controls the photographing section to photograph the 3D image responsive to a determination, by the subject situation determination section, that the timing is not suitable for photographing the 3D image, wherein the subject situation determination section calculates a distance between the subject and the photographing section from a focusing length of the photographing section, and determines the timing suitable for photographing the 3D image when the distance between the subject and the photographing section is less than a predetermined distance.

* * * * *